United States Patent
Lee et al.

(10) Patent No.: US 8,543,400 B2
(45) Date of Patent: Sep. 24, 2013

(54) VOICE PROCESSING METHODS AND SYSTEMS

(75) Inventors: Lin-Shan Lee, Taipei (TW); Che-Kuang Lin, Taipei (TW); Chia-Lin Chang, Taipei (TW); Yi-Jing Lin, Taipei (TW); Yow-Bang Wang, Taipei (TW); Yun-Huan Lee, Taipei (TW); Li-Wei Cheng, Taipei (TW)

(73) Assignee: National Taiwan University, Taipei (TW)

( * ) Notice: Subject to any disclaimer, the term of this patent is extended or adjusted under 35 U.S.C. 154(b) by 1493 days.

(21) Appl. No.: 12/135,026

(22) Filed: Jun. 6, 2008

(65) Prior Publication Data
US 2008/0306738 A1    Dec. 11, 2008

(30) Foreign Application Priority Data
Jun. 11, 2007    (TW) .............................. 96120944 A (51) Int. Cl.
  *G10L 15/06*    (2013.01)
  *G10L 15/10*    (2006.01)
  *G10L 15/26*    (2006.01)

(52) U.S. Cl.
USPC ........... 704/243; 704/231; 704/236; 704/251; 704/254; 704/255; 704/260; 704/270

(58) Field of Classification Search
USPC ................. 704/236, 251, 254, 255, 260, 270, 704/243
See application file for complete search history.

(56) References Cited

U.S. PATENT DOCUMENTS

| | | | | |
|---|---|---|---|---|
| 6,055,498 A * | 4/2000 | Neumeyer et al. | ............ | 704/246 |
| 6,206,700 B1 * | 3/2001 | Brown et al. | ................. | 434/116 |
| 6,226,611 B1 * | 5/2001 | Neumeyer et al. | ............ | 704/246 |
| 6,755,657 B1 * | 6/2004 | Wasowicz | ...................... | 434/167 |
| 7,062,441 B1 * | 6/2006 | Townshend | ................... | 704/270 |
| 7,299,188 B2 * | 11/2007 | Gupta et al. | .................. | 704/276 |
| 7,401,018 B2 * | 7/2008 | Yamada et al. | ............... | 704/251 |
| 7,467,087 B1 * | 12/2008 | Gillick et al. | .................. | 704/260 |
| 7,542,908 B2 * | 6/2009 | Segond et al. | ................ | 704/277 |
| 7,778,834 B2 * | 8/2010 | Higgins et al. | ................ | 704/270 |
| 2002/0072039 A1 * | 6/2002 | Rtischev et al. | ............. | 434/157 |
| 2002/0178381 A1 * | 11/2002 | Lee et al. | ...................... | 713/201 |
| 2003/0182111 A1 * | 9/2003 | Handal et al. | ................. | 704/231 |
| 2003/0225580 A1 * | 12/2003 | Lin | ............................. | 704/254 |
| 2004/0176960 A1 * | 9/2004 | Shpiro et al. | .................. | 704/277 |
| 2004/0215445 A1 * | 10/2004 | Kojima | ............................ | 704/9 |
| 2004/0230431 A1 * | 11/2004 | Gupta et al. | ................... | 704/254 |
| 2005/0255431 A1 * | 11/2005 | Baker | .......................... | 434/169 |
| 2006/0155538 A1 * | 7/2006 | Higgins et al. | ................ | 704/246 |
| 2007/0011005 A1 * | 1/2007 | Morrison et al. | ............. | 704/231 |
| 2007/0015121 A1 * | 1/2007 | Johnson et al. | ............... | 434/156 |
| 2007/0255570 A1 * | 11/2007 | Annaz et al. | ................... | 704/270 |
| 2009/0150154 A1 * | 6/2009 | Jang et al. | ..................... | 704/254 |

* cited by examiner

*Primary Examiner* — Pierre-Louis Desir (57) ABSTRACT

Voice processing methods and systems are provided. An utterance is received. The utterance is compared with teaching materials according to at least one matching algorithm to obtain a plurality of matching values corresponding to a plurality of voice units of the utterance. Respective voice units are scored in at least one first scoring item according to the matching values and a personified voice scoring algorithm. The personified voice scoring algorithm is generated according to training utterances corresponding to at least one training sentence in a phonetic-balanced sentence set of a plurality of learners and at least one real teacher, and scores corresponding to the respective voice units of the training utterances of the learners in the first scoring item provided by the real teacher.

11 Claims, 7 Drawing Sheets

VOICE PROCESSING METHODS AND SYSTEMS

CROSS REFERENCE TO RELATED APPLICATIONS

This application claims priority of Taiwan Patent Application No. 096120944, filed on Jun. 11, 2007, the entirety of which is incorporated by reference herein.

BACKGROUND OF THE INVENTION

1. Field of the Invention

The disclosure relates generally to voice processing methods and systems, and, more particularly to methods and systems that score and/or correct utterances according to personified voice processing techniques.

2. Description of the Related Art

Driven by the trend of globalization, people are learning at least a second language to improve his/her communication and competitive abilities. The major difficulty to learning a new language other than a native language is lack of opportunity and environment for speaking and listening. The most optimal learning environment is a one-to-one learning environment with a private tutor. However, the one-to-one learning environment is costly. Hence, learning systems implemented using software are designed to replace the learning environment with real live tutors. Users can voluntarily operate the learning systems to learn languages.

The learning systems provide opportunity and environment for learners to learn languages. Learners can repeatedly practice pronunciations using teaching materials provided by the learning systems. In an ideal learning system, the utterance pronounced by the learners should be scored, and pronunciation error patterns can be detected and corrected. Thus, the learners can correct learning mistakes according to the results generated by the learning system, to achieve language learning goals.

Unfortunately, most learning systems only have a demonstrative capability. That is, the learning systems only provide voice demonstrations of specific teaching materials. The learners must determine whether their pronunciations are correct or not according to the voice demonstrations, and correspondingly perform related adjustment. Some learning systems may have capabilities of voice scoring, and detection of pronunciation error patterns. However, the results of the systems and that achieved by real live teachers are very different. Therefore, a major bottleneck for current learning systems to overcome is to implement personified voice scoring, and detection and correction of pronunciation error patterns like those done by real teachers.

BRIEF SUMMARY OF THE INVENTION

Voice processing methods and systems are provided.

In an embodiment of a voice processing method, an utterance produced by a learner is received. The utterance is compared with an utterance produced by a teacher in teaching materials according to at least one matching algorithm to obtain a plurality of matching values corresponding to a plurality of voice units of the utterance. The respective voice units are scored in at least one first scoring item according to the matching values.

In an embodiment of a voice processing method to generate a personified voice scoring algorithm for scoring an utterance, training utterances corresponding to at least one training sentence in a phonetic-balanced sentence set of a plurality of learners and at least one real teacher are received. Scores corresponding to the respective voice units of the training utterances of the learners in the first scoring item provided by the real teacher are received. Then, the training utterances of the learners and that of the real teacher are compared according to at least one matching algorithm to obtain a plurality of matching values corresponding to a plurality of voice units of the training utterances. The personified voice scoring algorithm for the first scoring item is determined according to the matching values and the scores corresponding to the respective voice units of the training utterances in the first scoring item.

An embodiment of a voice processing system comprises a storage module, a reception module, and a processing module. The storage module comprises teaching materials. The reception module receives an utterance. The processing module compares the utterance with a corresponding utterance in the teaching materials according to at least one matching algorithm to obtain a plurality of matching values corresponding to a plurality of voice units of the utterance. The processing module scores the respective voice units in at least one first scoring item according to the matching values.

An embodiment of a voice processing system is used to generate a personified voice scoring algorithm for scoring an utterance comprises a storage module and a processing module. The storage module comprises a phonetic-balanced sentence set, training utterances corresponding to at least one training sentence in the phonetic-balanced sentence set of a plurality of learners and at least one real teacher, and scores corresponding respective voice units of the training utterances of the learners in at least one first scoring item provided by the real teacher. The processing module compares the training utterances of the learners and that of the real teacher according to at least one matching algorithm to obtain a plurality of matching values corresponding to a plurality of voice units of the training utterances. The processing module determines the personified voice scoring algorithm for the first scoring item according to the matching values and the scores corresponding to the respective voice units of the training utterances in the first scoring item.

In an embodiment of a voice processing method, an utterance produced by a learner is received. The utterance is aligned to a plurality of voice units of a corresponding utterance produced by a real teacher in teaching materials. It is determined whether any of the successive voice units in the utterance conform to at least one pronunciation error pattern.

An embodiment of a voice processing system comprises a storage module, a reception module, and a processing module. The storage module comprises teaching materials, and at least one pronunciation error pattern. The reception module receives an utterance produced by a learner. The processing module aligns the utterance to a plurality of voice units of a corresponding utterance produced by a real teacher in teaching materials, and determines whether any of the successive voice units in the utterance conform to the pronunciation error pattern.

Voice processing methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Voice processing methods and systems are provided.

Figure 1:
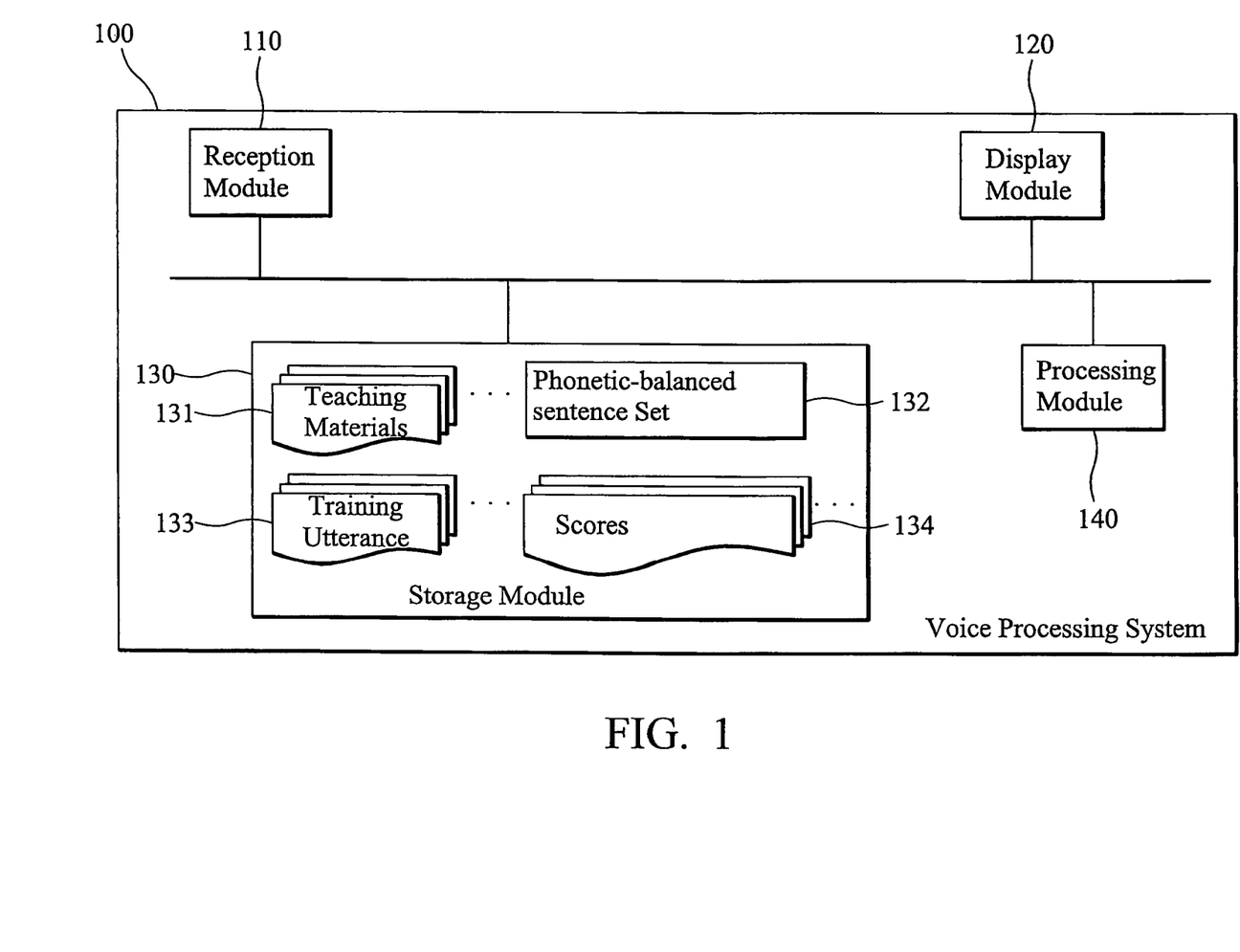
FIG. 1 is a schematic diagram illustrating an embodiment of a voice processing system according to the invention.

FIG. 1 is a schematic diagram illustrating an embodiment of a voice processing system according to the invention. In this embodiment, the voice processing system is used to generate a personified voice scoring algorithm.

Figure 2:
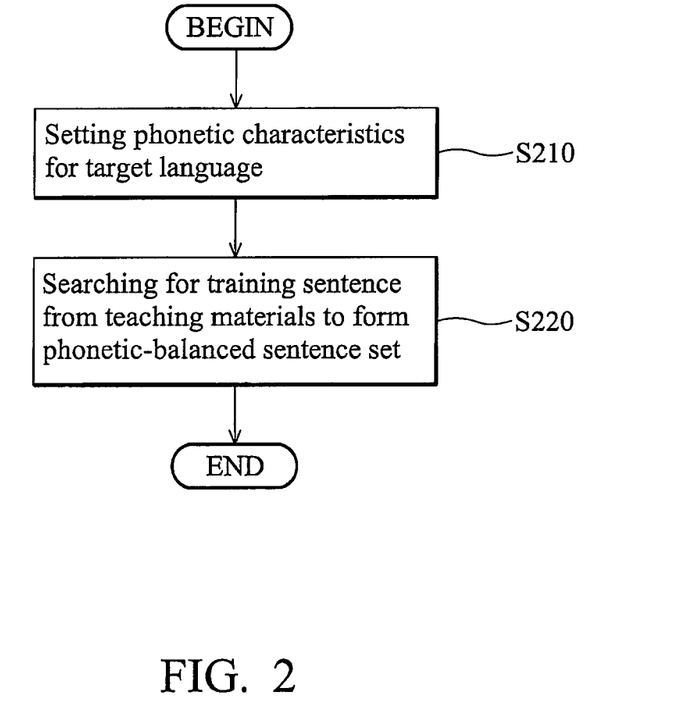
FIG. 2 is a flowchart of an embodiment of a method to generate a phonetic-balanced sentence set according to the invention.

The voice processing system 100 may be a language learning system for users to learn a target language. The voice processing system 100 comprises a reception module 110, a display module 120, a storage module 130, and a processing module 140. The reception module 110 receives inputs, such as voice inputs from users. The display module 120 displays related information, such as teaching materials corresponding to the target language, and phoneme patterns corresponding to the input utterances. The storage module 130 comprises teaching materials 131 corresponding to the target language, and a phonetic-balanced sentence set 132 comprising at least one training sentence. FIG. 2 is a flowchart of an embodiment of a method to generate a phonetic-balanced sentence set according to the invention. In step S210, a plurality of phonetic characteristics corresponding to the target language is set. In some embodiments, the phonetic characteristics may cover all voice units and/or pronunciation variations (cadences). The voice unit may be a phoneme, or syllable, initial or final in Chinese. The pronunciation variation may comprise the high-low variation of tone, the length of phonemes or syllables, and the pause in pronunciation, such as the tone and combinations thereof, and corresponding types in Chinese. In step S220, training sentences that can cover the phonetic characteristics are searched for from the teaching materials. The selected training sentences form the phonetic-balanced sentence set. In some embodiments, the phonetic-balanced sentence set comprises a minimum number of training sentences that can cover all phonetic characteristics.

A plurality of learners and at least one real teacher can produce utterances for at least one of the training sentences in the phonetic-balanced sentence set to obtain training utterances 133. The training utterances 133 may be received by the reception module 110, and stored in the storage module 130 of the voice processing system 100. Additionally, the real teacher can score the training utterances produced by the respective learners. The scores 134 can be entered to the voice processing system 100, and stored in the storage module 130. It is understood that the scores may comprise scores corresponding to the respective voice units of the training utterances in at least one first scoring item, scores corresponding to the respective entire sentence of training utterances in at least one second scoring item, and/or overall scores corresponding to the respective entire sentence of training utterances. The first scoring item may comprise the phoneme correctness, the pitch correctness, and/or the phoneme-length correctness for the respective voice units. The second scoring item may comprise the phoneme correctness, the pitch correctness, and/or the phoneme-speed correctness for the entire sentence of training utterances. It is noted that the first and second scoring items are not limited thereto.

Figure 3:
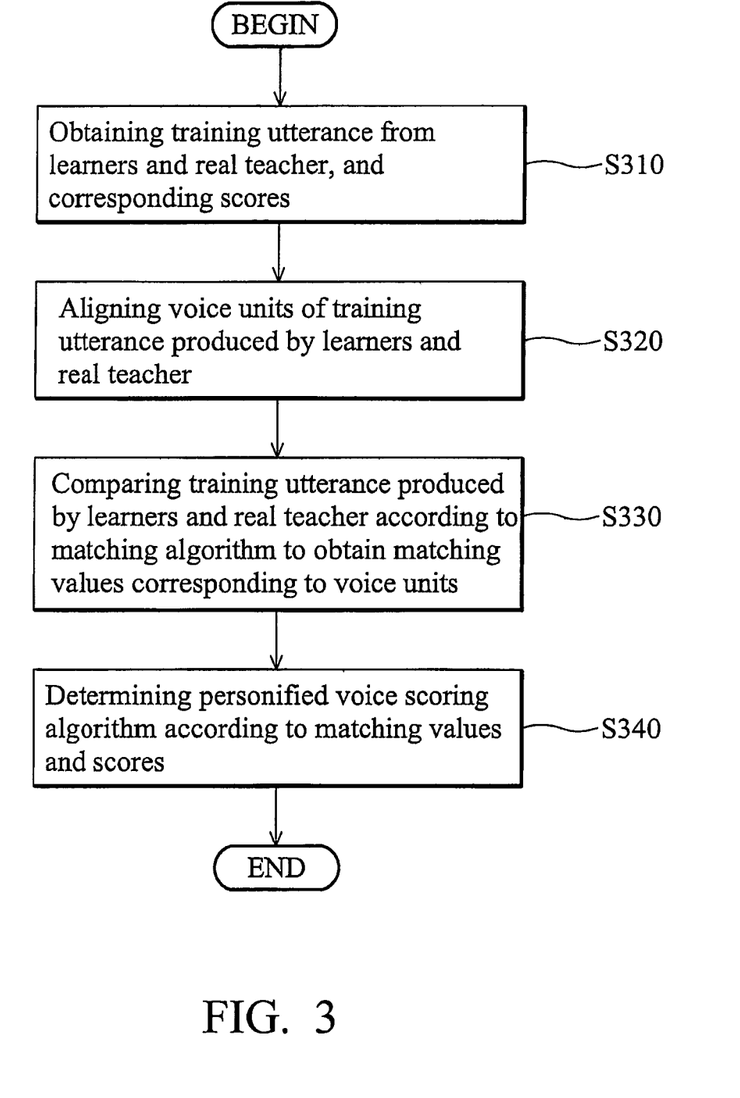
FIG. 3 is a flowchart of an embodiment of a method to generate a personified voice scoring algorithm according to the invention.
Figure 4:
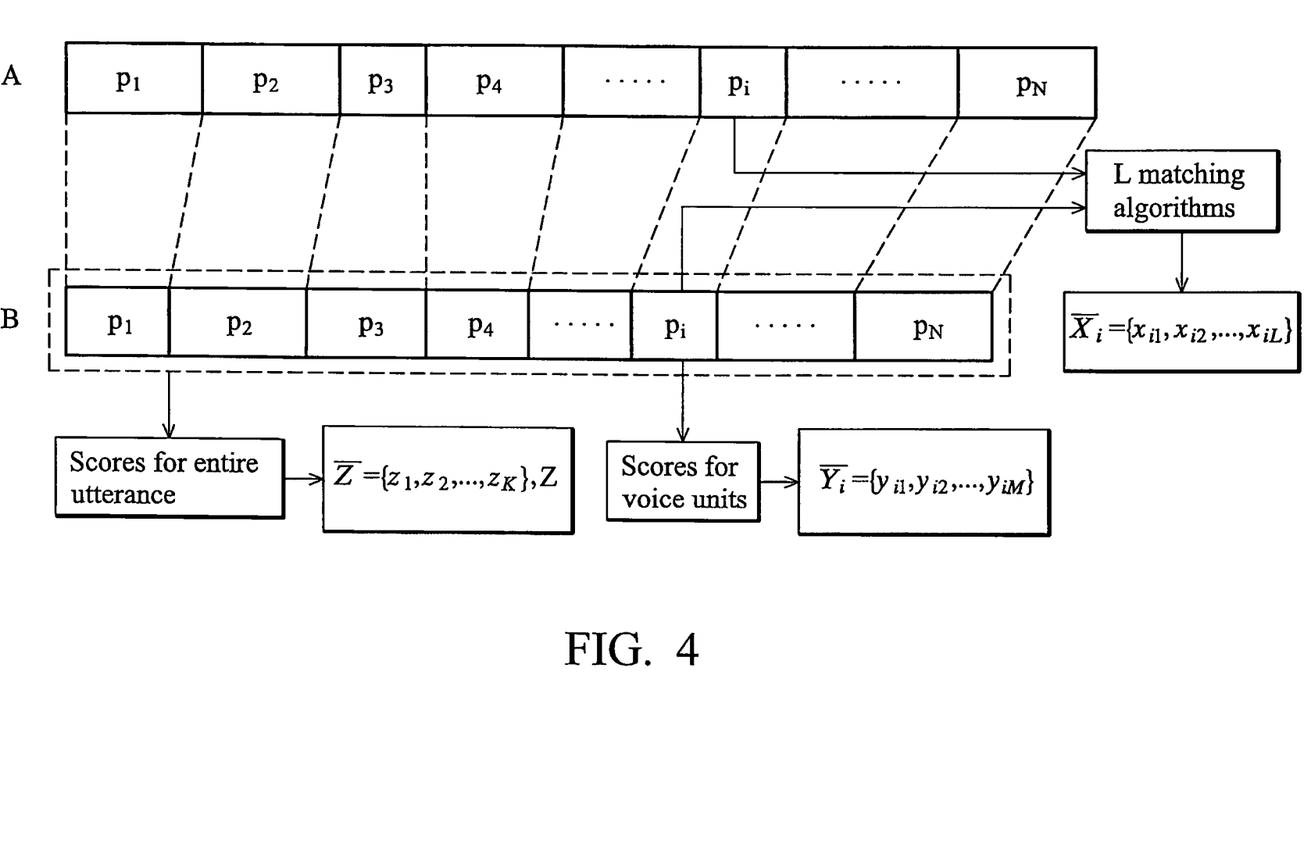
FIG. 4 is a schematic diagram illustrating an embodiment of the relationship between training utterances produced by a learner and a real teacher according to the invention.

The processing module 140 generates a personified voice scoring algorithm according to the training utterances 133 corresponding to the learners and the real teacher, and scores 134 of the training utterances corresponding to the respective learners. FIG. 3 is a flowchart of an embodiment of a method to generate a personified voice scoring algorithm according to the invention, and FIG. 4 is a schematic diagram illustrating an embodiment of the relationship between training utterances of a learner and a real teacher according to the invention, wherein A is the training voice of the real teacher, and B is the training voice of the learner. The method to generate a personified voice scoring algorithm is discussed by referring to FIGS. 3 and 4. In step S310, the training utterances produced by the learners and the real teacher are obtained, and the scores corresponding to the respective voice units of the training utterances and the respective entire sentence of training utterances provided by the real teacher are obtained. The scores corresponding to the respective voice units $P_i$ (the i-th voice unit) of the training utterances in M first scoring items are $\overline{Y}_i = \{y_{i1}, y_{i2}, \ldots, y_{iM}\}$, wherein $y_{im}$ is the score corresponding to the i-th voice unit $P_i$ in the m-th first scoring item. The scores corresponding to the respective entire sentence of training voice including N voice units $\{P_1, P_2, \ldots, P_N\}$ in the K second scoring items is $\overline{Z} = \{z_1, z_2, \ldots, z_K\}$, wherein $z_k$ is the score corresponding to the respective entire sentence of training utterances in the k-th second scoring item. The overall scores corresponding to the respective entire sentence of training utterances is Z. In step S320, the respective voice units of the training utterances produced by the learners and the real teacher are aligned according to a voice unit alignment method, such that $P_i$ in A is aligned to $P_i$ in B, as shown in FIG. 4. This can be achieved by a forced alignment using a Viterbi algorithm and the acoustic models of all the voice units, such that the respective voice units in the utterances produced by the learner and the real teacher are automatically aligned. In step S330, a similarity of spectral characteristic is calculated for the respective aligned voice units in the training utterances of the learner and the real teacher according to at least one matching algorithm, thus to compare the respective aligned voice units in the training utterances of the learner and the real teacher to obtain matching values corresponding to the respective voice units of the training utterances. The matching value of the voice unit $P_i$ is $\overline{X}_i = \{x_{i1}, x_{i2}, \ldots, x_{iL}\}$, wherein L is the number of the matching algorithms, as shown in FIG. 4. In step S340, the personified voice scoring algorithm is determined according to the matching values of the respective voice units, and the scores corresponding to the respective voice units of the training utterances, and the respective entire sentence of training utterances. It is understood that, the personified voice scoring algorithm may correspond to the first scoring item, the second scoring item, and the overall score of the entire sentence of training utterances, and is respectively discussed later.

In some embodiments, the estimation value $\hat{y}_{im}$ of the score $y_{im}$ of the i-th voice unit $P_i$ in the m-th first scoring item is a function $f_m(\cdot)$ of the L matching values of the voice unit, wherein $$\hat{y}_{im} = f_m(\overline{X}_i) = f_m(x_{i1}, x_{i2}, \ldots, x_{iL}), i=1,2,\ldots,N, m=1,2,\ldots,M \quad (1).$$

The estimation value $\hat{z}_k$ of the score $z_k$ of the entire sentence of training utterances in the k-th second scoring item and the scores corresponding to the respective voice units in the first scoring items have a functional relationship, wherein $$\hat{z}_k = g_k(\overline{Y}_i, i=1, 2, \ldots, N)$$

$$= g_k(\overline{Y}_1 = \{y_{11}, y_{12}, \ldots, y_{1M}\}; \overline{Y}_2 = \{y_{21}, y_{22}, \ldots, y_{2M}\}; \ldots; \overline{Y}_N = \{y_{N1}, y_{N2}, \ldots, y_{NM}\}) \quad (2).$$

Additionally, the estimation value $\hat{Z}$ of the overall score $Z$ of the entire sentence of training utterances is a function of the scores $\{z_1, z_2, \ldots, z_K\}$ of the entire sentence of training utterances in the second scoring items, wherein $$\hat{Z} = h(Z) = h(z_1, z_2, \ldots, z_K) \quad (3).$$

The above functions can be obtained using a Minimum Mean Square Error method or a Maximum Likelihood Estimation method, as the personified voice scoring algorithm corresponding to the first scoring item, the second scoring item, and the overall score of the entire sentence of training utterances.

The Minimum Mean Square Error method is to minimize the differences between the score calculated using the function and the score provided by the real teacher. That is, $$E[(y_{im} - \hat{y}_{im})^2] = \min \quad (4);$$

$$E[(z_k - \hat{z}_k)^2] = \min \quad (5); \text{ and}$$

$$E[(Z - \hat{Z})^2] = \min \quad (6).$$

$\hat{y}_{im}$, $\hat{z}_k$ and $\hat{Z}$ in function (4), (5) and (6) are respectively from Function (1), (2) and (3), and $y_{im}$, $z_k$ and $Z$ in Function (4), (5) and (6) are provided by the real teacher. $E[\bullet]$ is an expected value or the average over all training utterances for all the learners. For example, if the training utterances corresponding to a specific training sentence from 20 learners, and corresponding matching values and scores are obtained, the matching values and scores of the 20 learners are averaged. It is understood that each learner may be assigned a weight. For example, if two beginners are within the 20 learners, and the personified voice scoring algorithm would like to provide correct scoring results for beginners, the weights for the two beginners in Function (4), (5) and (6) can be raised.

Additionally, in the Maximum Likelihood Estimation method, the scores $\{y_{im}, m=1, 2, \ldots, M\}$, $Z=\{z_1, z_2, \ldots, z_K\}$ and $Z$ provided by the real teacher can be random variables, each having a probability distribution function defined by a series of assumed parameters. The scores corresponding to the training voice of the respective learners provided by the real teacher are the observations of the random variables. The functions (1), (2) and (3) (personified voice scoring algorithms) can be obtained according to the observations. It is noted that the Minimum Mean Square Error method and the Maximum Likelihood Estimation method are examples in this embodiment, and the invention is not limited thereto.

Figure 5:
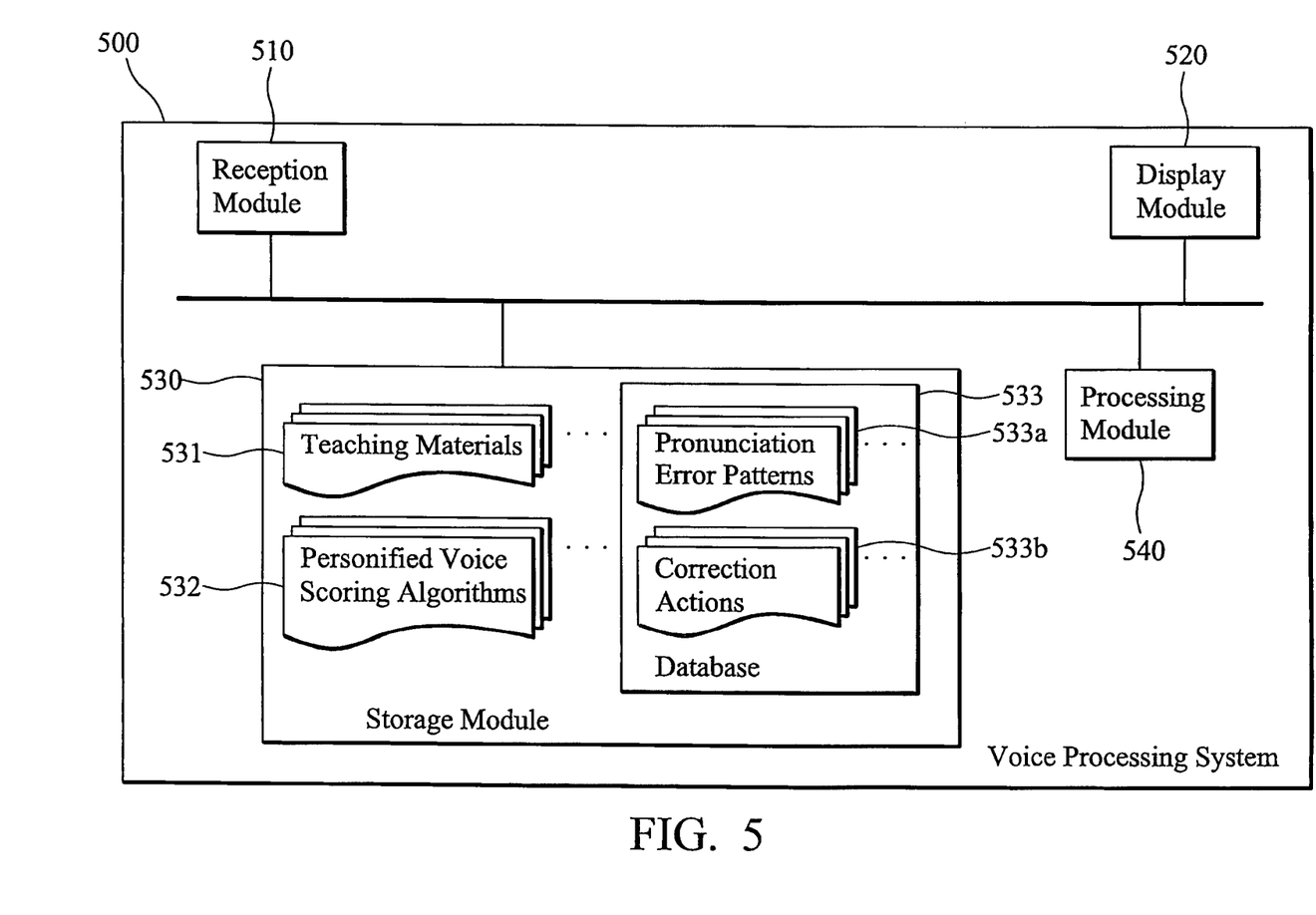
FIG. 5 is a schematic diagram illustrating an embodiment of a voice processing system according to the invention.

FIG. 5 is a schematic diagram illustrating an embodiment of a voice processing system according to the invention. In this embodiment, the voice processing system can provide teaching materials to learners to practice pronunciation, and provide related scores correspondingly. Additionally, the voice processing system can detect pronunciation error patterns occurring in utterances of the learners, and/or determine related correction actions.

The voice processing system 500 may be a language learning system for users to learn a target language. In some embodiments, the voice processing system 500 may be constructed in the network, and learners can access the voice processing system 500 via the network. In some embodiments, the voice processing system 500 may be constructed in a host, such as a computer system of a user. The voice processing system 500 comprises a reception module 510, a display module 520, a storage module 530, and a processing module 540. The reception module 510 receives inputs, such as voice inputs from users. The display module 520 displays related information, such as teaching materials corresponding to the target language, and pronunciation error patterns corresponding to the input utterances. The storage module 530 comprises teaching materials 531 corresponding to the target language, the personified voice scoring algorithms 532 may correspond to the first scoring item, the second scoring item, and the overall score of the entire sentence of training utterances, discussed in FIGS. 3 and 4, and a pronunciation error pattern detection and correction database 533. The pronunciation error pattern detection and correction database 533 comprises pronunciation error patterns 533a, and corresponding correction actions 533b. The processing module 540 performs the voice processing method of the invention, and the details are discussed later.

When learning a target language other than a user's first language, pronunciation error patterns may occur in the pronunciation of the target language. Generally, the phonetic errors that the learner may easily make very often have fixed pattern. During the scoring for the training utterances, the real teacher can simultaneously determine whether some phonetic characteristics of the respective voice units are erroneous, such as whether a consonant is retroflex, or a tone is correct. He can then determine whether a correct phonetic characteristic $w_i$ has become an erroneous phonetic characteristic $u_i$ or $v_i$. The situation of $w_i \rightarrow u_i$ and $w_i \rightarrow v_i$ are pronunciation error patterns 533a. The real teacher can provide correction actions 533b, such as indications that the consonant should be retroflex, mouth should be opened wider, or the tone should be higher corresponding to the pronunciation error patterns. The pronunciation error patterns 533a and the corresponding correction actions 533b form the pronunciation error pattern detection and correction database 533.

Figure 6:
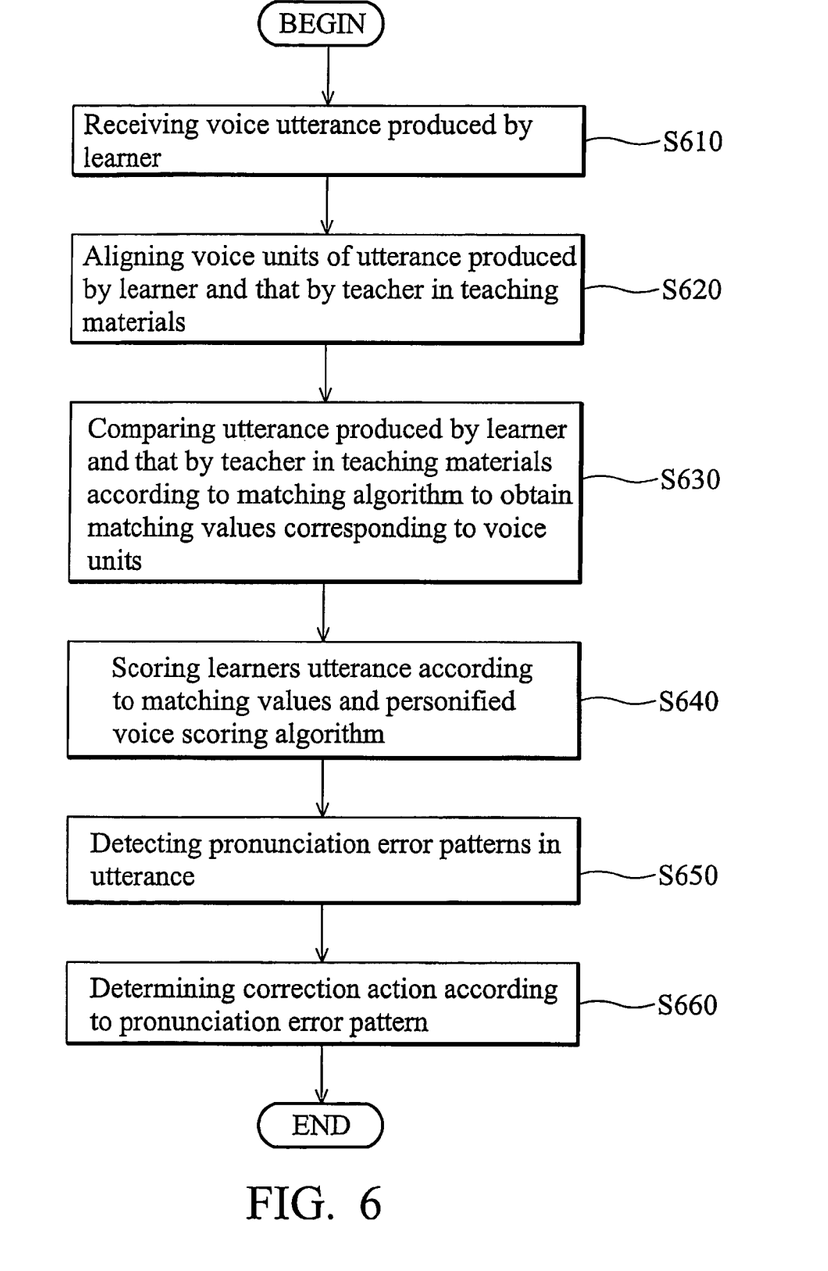
FIG. 6 is a flowchart of an embodiment of a voice processing method according to the invention.

FIG. 6 is a flowchart of an embodiment of a voice processing method according to the invention.

In step S610, an utterance produced by a learner corresponding to teaching materials is received. It is understood that, in some embodiments, the learner can select the teaching materials via a user interface (not shown). The selected teaching materials can be displayed via the display module 520. Then, the learner can practice pronunciations according to the teaching materials, and the produced utterances are entered to the voice processing system 500 via the reception module 510. In step S620, respective voice units of the received utterances produced by the learner and that by the real teacher in the teaching materials are aligned, and in step S630, the respective voice units of the utterances produced by the learner and that by the real teacher in the teaching materials are compared according to at least one matching algorithm to obtain a plurality of matching values $\overline{X}_i = \{x_{i1}, x_{i2}, \ldots, x_{iL}\}$ corresponding to the respective voice units $P_i$ of the utterance. Then, in step S640, the voice is scored according to the matching values and the at least one personified voice scoring algorithm. Similarly, the personified voice scoring algorithms may correspond to the first scoring item, the second scoring item, and the overall scoring. Therefore, the scores may correspond to respective voice units of the utterance in at least one first scoring item, the entire sentence of utterances in at least one second scoring item, and the overall score of the entire sentence. That is, the scores corresponding to the respective voice units of the utterance in at least one first scoring item are $\hat{y}_{im} = f_m(\overline{X}_i) = f_m(x_{i1}, x_{i2}, \ldots, x_{iL})$, wherein $i=1, 2, \ldots, N$ and $m=1, 2, \ldots, M$. The scores corresponding to the entire sentence of utterances in at least one second scoring item are $$\hat{z}_k = g_k(\overline{Y}_i, i=1, 2, \ldots, N)$$
$$= g_k \begin{pmatrix} \overline{Y}_1 = \{y_{11}, y_{12}, \ldots, y_{1M}\}; \\ \overline{Y}_2 = \{y_{21}, y_{22}, \ldots, y_{2M}\}; \ldots \\ \overline{Y}_N = \{y_{N1}, y_{N2}, \ldots, y_{NM}\} \end{pmatrix}.$$

Figure 7:
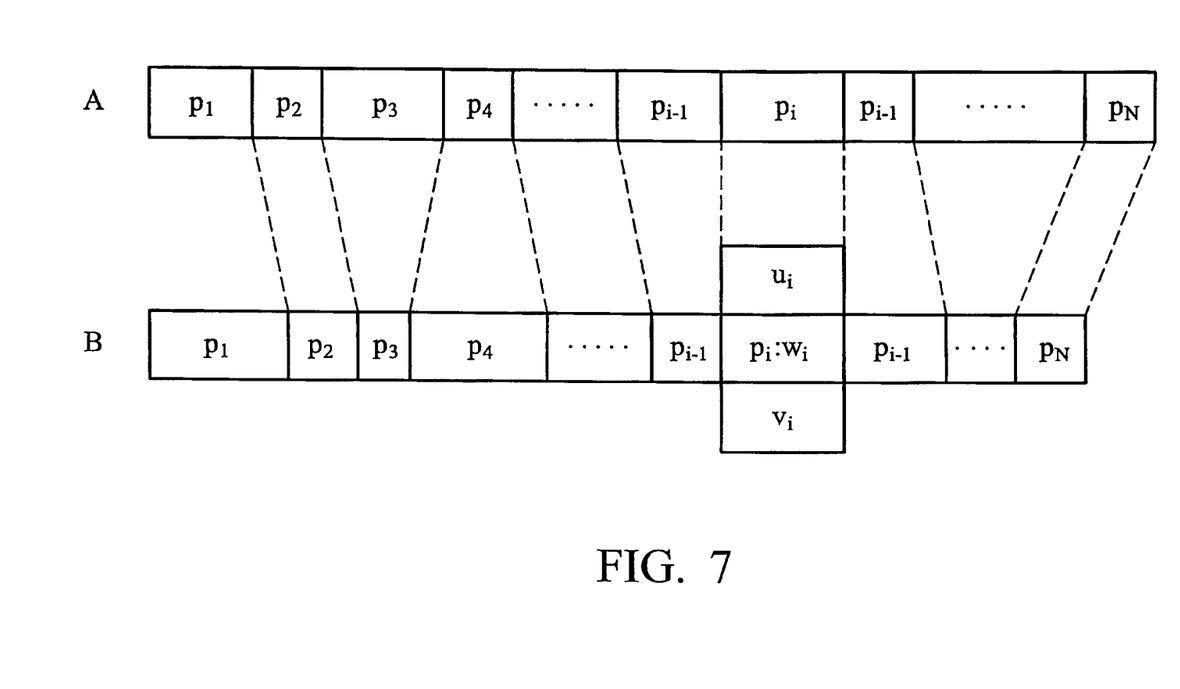
FIG. 7 is a flowchart of an embodiment of a method for detection and correction of pronunciation error patterns according to the invention.

The overall score corresponding to the entire sentence of utterances is $\hat{Z}=h(Z)=h(z_1, z_2, \ldots, z_K)$ wherein $f_m(\bullet)$, $g_k(\bullet)$ and $h(\bullet)$ are the personified voice scoring algorithms. Then, in step S650, it is determined whether at least one voice unit in the voice conforms to at least one pronunciation error pattern. That is, whether a pronunciation error pattern has occurred in the utterance is detected. If any voice unit conforms to the pronunciation error pattern (a specific pronunciation error pattern is detected), in step S660, a correction action is determined according to the detected pattern. FIG. 7 is a flowchart of an embodiment of a method for detection and correction of pronunciation error patterns according to the invention, wherein A represents N successive voice units of the teaching materials, and B represents N successive voice units of the utterance of the learner. As shown in FIG. 7, a phonetic characteristic $w_i$ of an i-th voice unit $P_i$ may become an erroneous phonetic characteristic $u_i$ or $v_i$, two known pronunciation error patterns. In some embodiments, since respective voice units are aligned, the phonetic characteristic of the voice unit in a phonetic section can be used to determine whether the correct phonetic characteristic $w_i$ or the erroneous phonetic characteristic $u_i$ or $v_i$ is produced using voice recognition techniques according to the aligned voice units. If the phonetic characteristic $u_i$ or $v_i$ is recognized, the corresponding correction actions are provided to the learner. In some embodiments, the voice units of the voice and the teaching materials can be displayed via the display module, and the voice units conforming to the pronunciation error pattern would be marked. It is understood that the detection of the pronunciation error patterns can be integrated with the voice scoring. For example, if a score of a specific voice unit is less than a threshold, a pronunciation error pattern may have occurred on the phonetic characteristic of the voice unit.

Therefore, the voice processing systems and methods of the invention can score utterances in various scoring items according to the personified voice scoring algorithms generated by the learners and a real teacher, and/or provide capabilities for detection and correction of pronunciation error patterns.

Voice processing methods and systems, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A voice processing method, comprising:
   receiving an utterance;
   comparing the utterance with a corresponding utterance in teaching materials according to at least one matching algorithm to obtain a plurality of matching values corresponding to a plurality of voice units of the utterance;
   scoring the respective voice units in at least one first scoring item according to the matching values corresponding to the respective voice units;
   scoring the utterance in at least one second scoring item according to the scores of the respective voice units in the first scoring item; and
   scoring the utterance in the second scoring item according to the scores of the respective voice units in the first scoring item and at least one personified voice scoring algorithm for the second scoring item, wherein the method for generating the personified voice scoring algorithm for the second scoring item comprises the steps of:
   receiving training utterances corresponding to at least one training sentence in a phonetic-balanced sentence set produced by a plurality of learners and at least one real teacher;
   comparing the training utterances of the learners and that of the real teacher according to at least one matching algorithm to obtain a plurality of matching values corresponding to a plurality of voice units of the training utterances;
   receiving scores corresponding to the respective voice units of the training utterances of the learners in the first scoring item provided by the real teacher;
   receiving scores corresponding to the training utterances of the learners in the second scoring item provided by the real teacher; and
   determining the personified voice scoring algorithm for the second scoring item according to the scores corresponding to the respective voice units of the training utterances in the first scoring item and the scores corresponding to the training utterances in the second scoring item.

2. The method of claim 1, further comprising aligning the respective voice units of the utterance to that of the teaching materials before the utterance is compared with the corresponding utterance in the teaching materials.

3. The method of claim 1, further comprising determining an overall score of the utterance according to the score of the utterance in the second scoring item.

4. The method of claim 1, wherein the first scoring item comprises the phoneme correctness, the pitch correctness, or the phoneme-length correctness for the respective voice units.

5. The method of claim 1, wherein the second scoring item comprises the phoneme correctness, the pitch correctness, or the phone-speed correctness for the voice.

6. The method of claim 1, further comprising determining whether at least one of the voice units conforms to at least one pronunciation error pattern.

7. The method of claim 6, further comprising determining a correction action according to the pronunciation error pattern when a specific voice unit within the voice units conforms to the pronunciation error pattern.

8. The method of claim 1, further comprising scoring the respective voice units in the first scoring item according to the matching values and at least one personified voice scoring algorithm, wherein the method for generating the personified voice scoring algorithm comprises the steps of:
   receiving training utterances corresponding to at least one training sentence in a phonetic-balanced sentence set produced by a plurality of learners and at least one real teacher;
   comparing the training utterances of the learners and that of the real teacher according to at least one matching algorithm to obtain a plurality of matching values corresponding to a plurality of voice units of the training utterances;
   receiving scores corresponding to the respective voice units of the training utterances of the learners in the first scoring item provided by the real teacher; and
   determining the personified voice scoring algorithm for the first scoring item according to the matching values and the scores corresponding to the respective voice units of the training utterances in the first scoring item.

9. The method of claim 8, wherein the method for generating the phonetic-balanced sentence set comprises the steps of:
   setting a plurality of phonetic characteristics for a target language; and
   searching for the at least one training sentence that covers the phonetic characteristics from the teaching materials to form the phonetic-balanced sentence set.

10. The method of claim 9, wherein the phonetic characteristics comprises all voice units or pronunciation variations for the target language.

11. The method of claim 1, further comprising determining an overall score of the voice according to the score of the voice in the second scoring item and a personified voice scoring algorithm for the overall score, wherein the personified voice scoring algorithm for the overall score is determined according to the scores corresponding to the training utterances of the learners in the second scoring item provided by the real teacher.

* * * * *